United States Patent
Hayes et al.

[11] Patent Number: 6,160,374
[45] Date of Patent: Dec. 12, 2000

[54] POWER-FACTOR-CORRECTED SINGLE-STAGE INDUCTIVE CHARGER

[75] Inventors: John G. Hayes, Redondo Beach, Calif.; Michael G. Egan, Cork City, Ireland

[73] Assignee: General Motors Corporation, Detroit, Mich.

[21] Appl. No.: 09/364,997

[22] Filed: Aug. 2, 1999

[51] Int. Cl.$^7$ ................................................ H01M 10/46
[52] U.S. Cl. ............................................................ 320/108
[58] Field of Search .................................... 320/108, 137, 320/140, 143; 336/DIG. 2

[56] References Cited

U.S. PATENT DOCUMENTS

| | | | |
|---|---|---|---|
| 5,099,186 | 3/1992 | Rippel et al. | 318/803 |
| 5,412,287 | 5/1995 | Shackle . | |
| 5,594,632 | 1/1997 | Barrett . | |
| 5,666,042 | 9/1997 | Lewis | 320/40 |

*Primary Examiner*—Edward H. Tso
*Attorney, Agent, or Firm*—Christopher DeVries; A. Luke Simon

[57] ABSTRACT

The present invention comprises a power-factor-corrected, single-stage inductive charger that may be used to charge a load, such as batteries of an electric vehicle. The inductive charger system is a single stage inductive charger compatible with the Society of Automotive Engineers inductive charging standard SAE J-1773. The single stage power processing provided by the inductive charger system includes both power factor correction and output power regulation using a relatively low parts count. The inductive charger system is fully soft switched over the line voltage and power range, resulting in high efficiency. The inductive charger system uses the current source operation of a series-parallel resonant converter feeding the SAE J-1773 interface to provide voltage gain for power factor correction over the full AC line cycle. The operating frequency of the converter is modulated around the current-source frequency to regulate the output power from zero to full load.

12 Claims, 1 Drawing Sheet

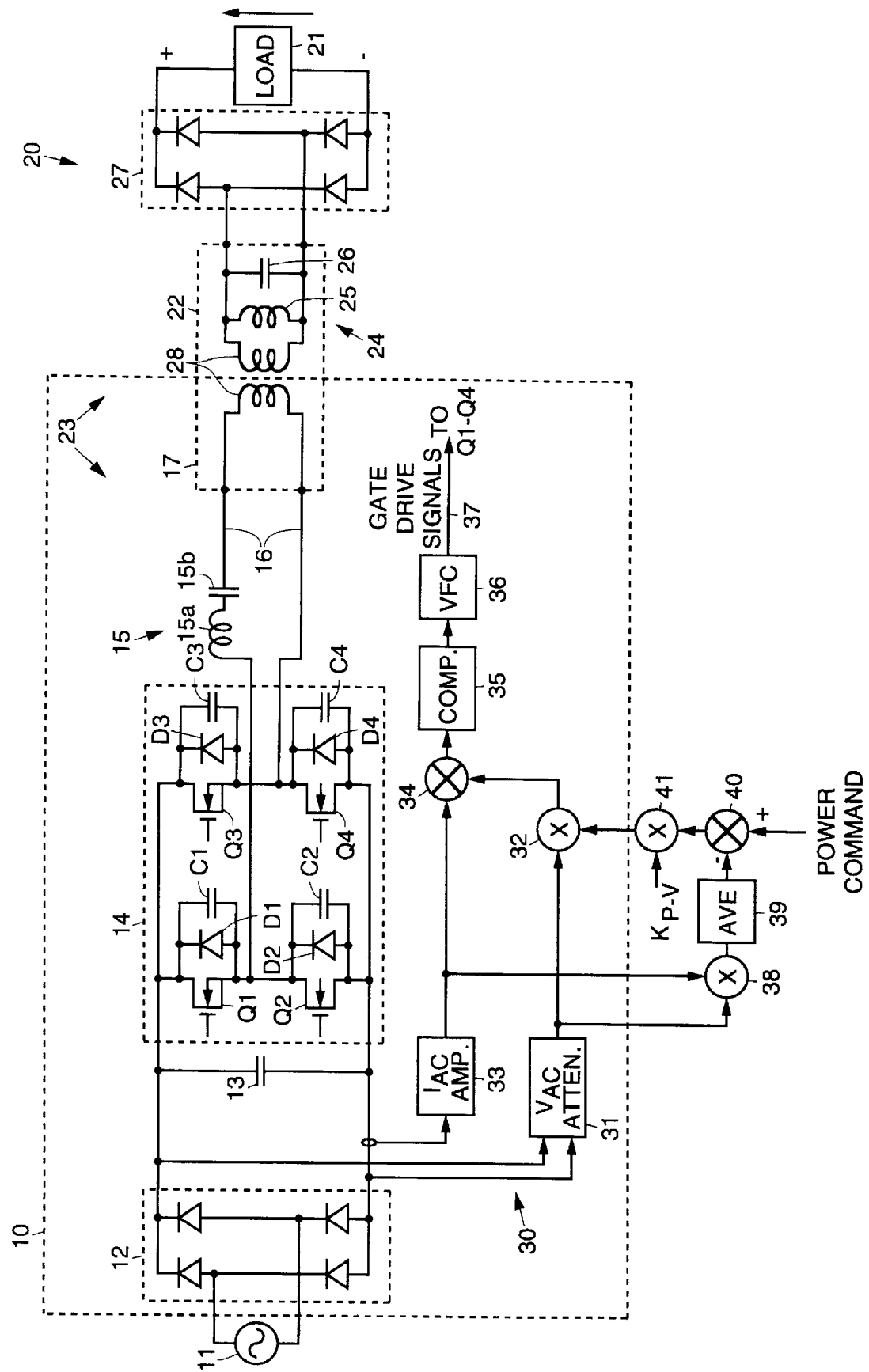

POWER-FACTOR-CORRECTED SINGLE-STAGE INDUCTIVE CHARGER

BACKGROUND

The present invention relates generally to electric vehicle charging systems, and more particularly, to a power-factor-corrected, single-stage inductive charger system or converter for use in inductive charging of electric vehicle batteries.

The assignee of the present invention manufactures electric vehicles and inductive charging systems to charge the batteries in these electric vehicles. The inductive charging system has two main components. The first component is the inductive charger which is located off the vehicle. The inductive charger conditions the low-frequency utility AC line power, and converts it to high-frequency AC power at the inductive coupler (or plug), which is the output of the inductive charger. The second component is the on-vehicle inductive inlet (or socket) which mates with the inductive coupler of the inductive charger. The high-frequency AC power from the inductive coupler is transformer-coupled on to the vehicle via the inductive inlet. The high-frequency power on the vehicle is subsequently rectified and filtered to generate a DC current to charge the batteries.

The current electric vehicle inductive chargers manufactured by the assignee of the present invention are known as Standard Charge Modules and Convenience Charge Modules. These chargers have two power stages in series to process the power from the utility line to the inductive coupler. The first stage, which is typically a boost-type converter, power factor corrects the current drawn from the rectified low-frequency utility AC line. Such a correction in the wave shape of the utility AC line current maximizes the available utility power and minimizes the utility AC line current and voltage distortion. The first stage additionally converts the rectified utility low-frequency AC to high-voltage DC by filtering the AC using large bulky electrolytic capacitors.

The second power processing stage has two functions: (1) it controls the output power to the battery and (2) conditions the high-frequency AC voltage and current for input to the inductive cable and coupler. The second stage is generally a resonant inverter with MOSFET switches and a series tank composed of an inductor and capacitor. This resonant inverter chops the high voltage DC, produced by the first stage, into high-frequency AC. The high-frequency AC is filtered by the series tank, and fed into a cable which connects to the winding of the inductive coupler, for subsequent transformer-coupling onto the vehicle via the inductive inlet.

The resonant inverter operates at a frequency above the natural frequency of the series tank to enable soft switching of the inverter MOSFETs, resulting in a high efficiency of power transfer. The power transferred from the utility to the battery can be easily regulated by controlling the operating frequency of the resonant inverter. Decreasing the operating frequency will result in increased load current to the battery and vice versa.

The inductive charging for electric vehicles is standardized using the Society of Automotive Engineers Inductive Charge Coupling Recommended Practice, SAE J-1773. SAE J-1773 defines a common electric vehicle conductive charging system and architecture and the functional requirements of the vehicle inlet and mating connector. The inductive charging vehicle inlet defined by the SAE J-1773 practice contains two significant passive elements. These are the transformer magnetizing inductance and a discrete capacitance connected in parallel with the transformer secondary.

When the inductive charger is coupled to the inductive inlet, the series tank of the charger and the parallel tank of the inlet together result in a series-parallel tank. Driving the frequency-controlled resonant inverter into the series-parallel resonant tank which feeds the rectifier and voltage-source battery load results in many beneficial attributes for the charger and inlet: the transformer and cable leakage inductances complement the larger series inductance of the charger; high transformer turns ratio to minimize primary current stress in the charger; buck/boost voltage gain; current-source operation; monotonic power transfer characteristic over a wide load range; throttling capability down to no-load; high-frequency operation; narrow modulation frequency range; use of zero-voltage-switched MOSFETs with slow integral diodes; high efficiency; inherent short-circuit protection, and soft recovery of the output rectifiers.

The first stage of the charger contains many parts, such as a heavy filter inductor, bulky electrolytic storage capacitors, costly power semiconductors, heavy heat sinks, etc, all of which add significant size, weight, and cost to the charger system. The resonant converter also contains many parts. It would therefore be desirable to significantly reduce the number of components in electric vehicle charger systems. It would also be desirable to eliminate the first power processing stage and use only the second stage operating as a single-stage charger. It would also be desirable to have power-factor-correction for the utility interface and SAE J-1773 compatibility for the electric vehicle inductive inlet interface.

SUMMARY OF THE INVENTION

The present invention comprises a power-factor-corrected single-stage inductive charger. The power-factor corrected single-stage inductive charger is used to charge a load, such as batteries of electric vehicles, via an on-vehicle inductive charging inlet. The power-factor-corrected single-stage inductive charger system is the only known single-stage inductive charger compatible with SAE J-1773.

The power processing provided by the power-factor-corrected single-stage inductive charger includes both power factor correction and output power regulation using a relatively low parts count. The power-factor-corrected single-stage inductive charger system is fully soft switched over the line voltage and power range, resulting in high efficiency. The power-factor-corrected single-stage inductive charger maintains all of the beneficial attributes of the series-parallel resonant converter previously discussed.

The power-factor-corrected single-stage charger has a line rectifier, a high-frequency filter capacitor, a MOSFET inverter, and a series tank, composed of an inductor and a capacitor, which feeds the cable and inductive coupler. Thus, the power-factor-corrected single-stage inductive charger is similar to the two-stage charger previously discussed except the invention does not require the first power processing stage or the storage capacitors. The invention does not filter the low-frequency AC but passes it through and allows the battery to filter it.

It had previously been established that this type of converter can regulate power to the battery. The heart of the invention is that it can also provide power factor correction. This is explained as follows. It can be mathematically and empirically demonstrated that the series-parallel tank, formed by the series tank of the charger and the parallel tank of the inlet, has a natural frequency at which it acts as a constant-current source. This natural frequency is known as the current-source frequency and occurs when (1) the reactance of the series tank equals the reactance of the parallel tank, and (2) the converter operates in the frequency range where the series tank is inductive in nature, i.e., above the natural frequency of the series tank, and the parallel tank is capacitive in nature, i.e., above the natural frequency of the parallel tank. At this frequency, the current sourced to the battery is constant, limited only by the amplitude of the line voltage and the impedance of the series tank, and is independent of the voltage of the electric vehicle battery.

The significance of this current-source nature of the charger is that not only can the charger provide current to the battery when the rectified AC line voltage is high, it can also provide current to the battery at all lesser AC line voltages, even when the AC line voltage is very low. The charger can source current to the battery when the AC line voltage is low by operating the resonant converter at or close to the current-source frequency. Operating within the design constraints of the charger, the charger can increase or decrease the current to the battery by decreasing or increasing the operating frequency.

With this current control capability, the charger can be designed to power factor correct ,and regulate, the utility AC line current over the line cycle. The controller of the charger senses the line voltage and commands the power stage of the charger to source AC line current which has the same shape as the AC line voltage.

The power-factor-corrected single-stage inductive charger significantly reduces the cost, parts count, complexity, weight, and volume of the chargers manufactured by the assignee of the present invention, while providing increased reliability and equivalent functionality.

BRIEF DESCRIPTION OF THE DRAWINGS

The various features and advantages of the present invention may be more readily understood with reference to the following detailed description taken in conjunction with the accompanying drawing figure which illustrates an exemplary power-factor-corrected single-stage inductive charger system in accordance with the principles of the present invention.

DETAILED DESCRIPTION

Referring to the drawing figure, it illustrates an exemplary power-factor-corrected, single-stage inductive charger 10 or charger system 10 in accordance with the principles of the present invention. The exemplary power-factor-corrected, single-stage inductive charger 10 is fed from an alternating current (AC) utility line source 11 that is coupled to a line rectifier block 12 in the charger. A small high frequency bus filter capacitor 13 is coupled across the line rectifier block 12. A MOSFET-based fall-bridge or half-bridge inverter 14 is coupled to the line rectifier block 12 and the filter capacitor 13. A two-element series-resonant tank circuit 15, including an inductance 15a, LS, and a capacitance 15b, CS, couples energy from the inverter 14. A cable 16 and inductive coupler 17 are used to couple energy from the charger 10.

An inductive inlet 22 in the electric vehicle 20 receives the inductive coupler 17 and transformer couples power from the coupler 17. The energy coupled into the inductive inlet 22 is filtered by the parallel resonant tank circuit 24, and is rectified using a line rectifier block 27. The rectified (DC) energy is coupled to the voltage-source load, in this case, batteries 21 (load 21) of the electric vehicle 20.

The inductive coupler 17 and the inductive inlet 22 comprise a transformer 28 that couples energy from the charger 10 to the electric vehicle 20. The parallel resonant tank of the inlet comprises the transformer magnetizing inductance 25 formed by the coupling and a capacitor 26 in parallel with the secondary winding. The values of these parallel components are defined in the SAE J-1773 standard.

The series-parallel resonant network 23 includes two separate resonant tank circuits which are the series resonant tank circuit 15 of the charger and the parallel resonant tank circuit 24 of the inlet. The full bridge inverter 14 includes a plurality of controlled switches Q1, Q2, Q3, Q4, their intrinsic antiparallel diodes D1, D2, D3, D4, and snubber capacitors C1, C2, C3, C4 to facilitate zero-voltage-switching. First and third switches Q1, Q3 are gated together in a complementary fashion to second and fourth switches Q2, Q4.

The control aspects of the converter 10 is implemented in a controller 30 in a relatively simple manner as follows. The AC line voltage is rectified by the line rectifier block 12 and is attenuated by an attenuator 31 to provide a reference line voltage signal. The rectified AC line current is sensed and is fed back through a current amplifier 33 to provide a feedback line current signal. The reference line voltage signal is multiplied by the feedback line current signal in a multiplier 38 to generate an instantaneous feedback power signal into the charger from the utility line source 11 over the line cycle. This instantaneous feedback power signal is averaged using an averaging circuit 39 to provide an average feedback power signal.

The charger receives a power command from the vehicle. The average feedback power signal is subtracted from the power command signal using an adder 40 to generate an average power error signal. The average power error signal is multiplied by a power-to-voltage scaling factor ($K_{p\text{-}v}$) using a power-to-voltage scaling multiplier 40 to generate a line voltage scaling factor.

The reference line voltage signal is then multiplied by the line voltage scaling factor in a multiplier 32 and the product forms a reference line current signal. The feedback line current signal is subtracted from the reference line current signal in an adder 34 to generate a current error signal, and the current error signal is fed into an error amplifier 35. The amplified current error signal from the error amplifier 35 is then input to a voltage to frequency converter (VFC) 36. The output of the voltage to frequency converter 36 provides gate drive signals 37 for the switches (Q1–Q4) of the full-bridge inverter 14.

Using the control outlined above, the power-factor-corrected single-stage inductive charger 10 regulates power to the batteries 21 as commanded by the vehicle, and provides power factor correction by controlling the line current to have the same shape as the line voltage.

The power-factor-corrected single-stage inductive charger 10 has several beneficial features for driving the inductive inlet 22 as follows. The leakage inductances of the transformer 28 and cable 16 complement the larger series inductance 15a of the charger. A high turns ratio for the transformer 28 may be used to minimize primary current stress in the charger 10. The charger 10 provides buck/boost voltage gain and provides current-source operation to enable power factor correction. The charger 10 has a monotonic power transfer characteristic over a wide load range. The charger 10 exhibits throttling capability down to no-load and provides high-frequency operation. The charger 10 has a narrow modulation frequency range. A preferred embodiment of the charger 10 uses zero-voltage-switched MOSFET transistors Q1–Q4 with slow integral diodes D1–D4. The charger 10 exhibits high efficiency. The charger 10 has inherent short-circuit protection and provides for soft recovery of output rectifiers in the vehicle inlet.

The power-factor-corrected single-stage inductive charger 10 is designed to replace existing Standard Charge Modules and Convenience Charge Modules manufactured by the assignee of the present invention. The power-factor-corrected, single-stage inductive charger 10 reduces the charge module complexity, volume and the electrical parts cost and count, while increasing reliability through the elimination of electrolytic capacitors.

A 6 kW, 240 VAC input prototype power-factor-corrected single-stage inductive charger 10 has been designed, built and experimentally tested. The data gathered from this prototype charger 10 correlated well to the results predicted both by analysis and simulation. The prototype charger 10 operated substantially as described herein.

Thus, a power-factor-corrected single-stage inductive charger has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. An inductive charger system comprising:
    an AC line rectifier;
    a filter capacitor coupled across the line rectifier;
    an inverter coupled to the line rectifier and the filter capacitor;
    a series resonant tank circuit coupled to the inverter;
    a charge coupler and inductive inlet comprising a transformer and a parallel resonant tank circuit for coupling energy to a load;
    a controller for regulating power supplied to the load by increasing the operating frequency of the system to reduce output current for a given voltage;
    wherein the parallel resonant tank circuit comprises a parallel inductance and a parallel capacitor, and
    wherein the parallel inductance and parallel filter capacitor are disposed in the inductive inlet.

2. The system recited in claim 1 wherein the filter capacitor comprises a high frequency non-electrolytic filter capacitor.

3. The system recited in claim 2 wherein the inverter comprises a MOSFET-based fill-bridge inverter.

4. The system recited in claim 1 wherein the inverter comprises a MOSFET-based half-bridge inverter.

5. The system recited in claim 1 wherein the load comprises batteries of an electric vehicle.

6. The system recited in claim 3 wherein the full bridge inverter includes a plurality of controlled switches, their intrinsic antiparallel diodes, and snubber capacitors to facilitate zero-voltage-switching.

7. The system recited in claim 6 wherein the first and third switches are gated together in a complementary fashion to second and fourth switches.

8. The system recited in claim 1 wherein the controller comprises:
    an attenuator for attenuating the rectified AC line voltage to provide a reference line voltage signal;
    a current amplifier for sensing the rectified AC line current and for amplifying the sensed signal to provide a feedback line current signal;
    a multiplier for multiplying the reference line voltage signal by the feedback line current signal to generate an instantaneous feedback power signal;
    an averaging circuit for averaging the instantaneous feedback power signal to provide an average feedback power signal;
    a power-to-voltage scaling multiplier for multiplying the average power error signal by a power-to-voltage scaling factor to generate a line voltage scaling factor a multiplier for multiplying the reference line voltage signal by the line voltage scaling factor to generate a reference line current signal;
    an adder for subtracting the feedback line current signal from the reference line current signal to generate a current error signal;
    an error amplifier for amplifying the current error signal; and
    a voltage to frequency converter for converting the current error signal into gate drive signals for the switches of the inverter.

9. An inductive charger system for a vehicle comprising:
    an AC line rectifier;
    a filter capacitor coupled across the line rectifier;
    an inverter coupled to the line rectifier and the filter capacitor;
    a series resonant tank circuit coupled to the inverter;
    a charge coupler and inductive inlet for coupling power to the vehicle comprising a transformer and a parallel resonant tank circuit; and
    a controller for regulating power supplied to the vehicle by increasing the operating frequency of the system to reduce output current for a given voltage.

10. The inductive charger system of claim 9, wherein the charge coupler comprises a plug insertable into the inductive inlet.

11. An inductive charger system for a vehicle comprising:
    a first charging circuit comprising:
    an AC line rectifier;
    a filter capacitor coupled across the line rectifier;
    an inverter coupled to the line rectifier and the filter capacitor;
    a series resonant tank circuit coupled to the inverter;
    a second charging circuit located in the vehicle that electromagnetically couples to said first charging circuit to transfer electrical energy from said first charging circuit to said second charging circuit using a charge coupler and inductive inlet comprising a transformer and a parallel resonant tank circuit; and
    a controller for regulating power supplied to the load by increasing the operating frequency of the system to reduce output current for a given voltage.

12. The inductive charger system of claim 11, wherein the first charging circuit and second charging circuit are adapted to be physically decoupled.

* * * * *